(12) United States Patent
Kroepfl et al.

(10) Patent No.: US 8,244,431 B2
(45) Date of Patent: Aug. 14, 2012

(54) DETERMINING VELOCITY USING MULTIPLE SENSORS

(75) Inventors: Michael Kroepfl, Redmond, WA (US); Joachim Pehserl, Graz (AT); Joachim Bauer, Graz (AT); Stephen L. Lawler, Kirkland, WA (US); Gur Kimchi, Bellevue, WA (US); John Curlander, Boulder, CO (US)

(73) Assignee: Microsoft Corporation, Redmond, WA (US)

( * ) Notice: Subject to any disclaimer, the term of this patent is extended or adjusted under 35 U.S.C. 154(b) by 758 days.

(21) Appl. No.: 12/370,618

(22) Filed: Feb. 13, 2009

(65) Prior Publication Data

US 2010/0211317 A1    Aug. 19, 2010

(51) Int. Cl.
*G01C 21/00* (2006.01)
(52) U.S. Cl. ............... 701/36; 701/70; 701/79
(58) Field of Classification Search ............ 701/70, 701/79, 300, 301, 208, 209, 213, 214–217, 701/220, 221, 223, 36
See application file for complete search history.

(56) References Cited

U.S. PATENT DOCUMENTS

| | | | |
|---|---|---|---|
| 5,410,478 | A | 4/1995 | Richard et al. |
| 7,289,906 | B2 | 10/2007 | Van Der Merwe et al. |
| 2005/0060069 | A1* | 3/2005 | Breed et al. .............. 701/29 |
| 2007/0213889 | A1 | 9/2007 | Parra Carque |
| 2008/0030605 | A1* | 2/2008 | Tsukimura et al. ......... 348/302 |
| 2008/0086248 | A1* | 4/2008 | Lu et al. .................... 701/41 |
| 2008/0158256 | A1 | 7/2008 | Russell et al. |
| 2008/0195304 | A1 | 8/2008 | Krishnaswamy |
| 2009/0140887 | A1* | 6/2009 | Breed et al. .............. 340/990 |

OTHER PUBLICATIONS

Ernest, et al., "Train Locator using Inertial Sensors and Odometer", retrieved at <<http://ieeexplore.ieee.org/stamp/stamp.jsp?arnumber=01336497>>, IEEE, Intelligent Vehicles Symposium, Italy, Jun. 14-17, 2004, pp. 860-865.
Mayhew, David McNeil, "Multi-Rate Sensor Fusion for GPS Navigation using Kalman Filtering", retrieved at <<http://scholar.lib.vt.edu/theses/available/etd-062899-064821/unrestricted/etd.PDF>>, May 1999, pp. 125.
Kruif, et al., "Sensor Fusion for Linear Motors, An Approach for Low-Cost Measurements", <<retrieved at http://www.ce.utwente.nl/rtweb/publications/2002/pdf-files/051CE2002.pdf>>, Proc. of Mechatronics 2002, University of Twente, Jun. 24-26, 2002, pp. 554-563.
Mort, et al., "Application of Sensor Fusion to Railway Systems", retrieved at <<http://ieeexplore.ieee.org/stamp/stamp.jsp?arnumber=00572176>>, Proceedings of the 1996, IEEE/SICE/RSI International Conference on Multisensor Fusion and Integration for Intelligent Systems, pp. 185-192.
Dixon, et al., "Mobile Robot Navigation", retrieved at <<http://www.doc.ic.ac.uk/~nd/surprise_97/journal/vol4/jmd/>>, Jun. 10, 1997, pp. 34.

(Continued)

*Primary Examiner* — Richard M. Camby

(57) ABSTRACT

A system described herein includes a receiver component that receives first velocity data that is indicative of a velocity of a vehicle over a period of time, wherein the first velocity data corresponds to a first sensor. The receiver component also receives second velocity data that is indicative of the velocity of the vehicle over the period of time, wherein the second velocity data corresponds to a second sensor. The system also includes a modifier component that determines a difference between the first velocity data and the second velocity data and outputs at least one final velocity value for the vehicle based at least in part upon the first difference data.

18 Claims, 16 Drawing Sheets

OTHER PUBLICATIONS

Liu, et al., "Accelerometer for Mobile Robot Positioning", retrieved at <<http://ieeexplore.ieee.org/stamp/stamp.jsp?arnumber=00924763>>, IEEE Transactions on Industry Applications, vol. 37, No. 3, May/Jun. 2001, pp. 812-819.

* cited by examiner

DETERMINING VELOCITY USING MULTIPLE SENSORS

BACKGROUND

Functionality of conventional mapping applications that are accessible by way of the Internet has substantially increased over time. For instance, the user can access a mapping application and be provided with an overhead view of one or more streets. Further, the user may provide an initial location (e.g., street address) and a destination and the mapping application can provide the user with detailed directions pertaining to traveling between the initial location and the destination.

Mapping applications have further developed such that an individual can view aerial images of a particular region. For instance, if a user enters a particular location (e.g., address, business name) the user can be provided with aerial images pertaining to such entered location. These images may then be subjected to a zooming function such that the user can be provided with a relatively close aerial view of the entered location. Furthermore, driving directions may be graphically laid on top of the aerial images, thus providing the user with some context with respect to a route to be traveled between the initial location and the destination.

Some mapping applications have further been adapted to include three-dimensional models of buildings in certain cities. Thus, a user can enter a location into the mapping application and be placed in a three-dimensional model pertaining to such location. The user may then navigate the three-dimensional model to be provided with context pertaining to the location. For example, if the user is planning to travel to Paris, France the user can provide the mapping application with the location of Paris, France and be provided with a three-dimensional representation of the city. The user may then navigate the representation and be provided with a first person perspective of one or more buildings, streets, etc. pertaining to the city of Paris. Thus, the user can "travel" through the city by way of the representation to obtain information pertaining to such city, such as the height of buildings, location of buildings in respect to one or more streets, etc.

Typically these three-dimensional models are generated first and thereafter are updated with aerial images which can be used to provide greater information pertaining to a building or buildings such as the look/texture of a building facade. Because these images are aerial images, however, the resolution of the images is less than desired. Moreover the captured aerial images may not be well-suited for adaption to a three-dimensional model.

Accordingly, it may be desirable to adapt a vehicle with one or more cameras to capture images of building facades in one or more cities as well as adapt the vehicle with various sensors to collect metadata pertaining to captured images. This data, for instance, may thereafter be used to automatically generate three-dimensional representations of a geographic region including one or more buildings, cities, etc. In an example, it may be desirable to determine velocity and/or location data pertaining to a particular captured image. Such metadata can be captured, for instance, by one or more sensors such as a GPS sensor, a velocity sensor, an accelerometer, etc. GPS receivers, however, may not provide sufficient accuracy for automatically generating a three-dimensional model, as a typical GPS receiver can have an error in the range of +/−5 meters for each sensed location output by the GPS receiver. Other sensors exist that are capable of providing highly accurate position, velocity and/or acceleration data. However, such sensors tend to be extraordinarily expensive (e.g., in the range of tens of thousands of dollars). On the other hand, low cost sensors tend to provide data with less than sufficient accuracy for automated generation of three-dimensional models.

SUMMARY

The following is a brief summary of subject matter that is described in greater detail herein. This summary is not intended to be limiting as to the scope of the claims.

Various technologies pertaining to determining velocity of a vehicle based upon data output by multiple sensors are described in detail herein. Pursuant to an example, a data capture system may include a digital camera that is mounted to an automobile, wherein the digital camera is configured to capture images of building facades as the automobile traverses over one or more streets. The data capture system may additionally include a velocity sensor which can output data that is indicative of velocity of the vehicle. Moreover, the data capture system may include an acceleration sensor such as a Micro-Electro-Mechanical-System (MEMs) acceleration sensor, which can output data indicative of acceleration of the vehicle as it travels over the one or more streets.

Pursuant to an example, the velocity sensor may be associated with a significant amount of error when the vehicle is travelling at relatively low velocity. These errors, for instance, may be ascertained when viewing a graphical representation of sensed velocities, as improbable/impossible spikes in velocity may be sensed by the velocity sensor over time. In addition, the accelerometer may experience an offset error over time such that, for instance, when the accelerometer captures data over several minutes, values for acceleration may be offset in an upward or downward direction. Accordingly, data output by the velocity sensor or the accelerometer alone is not sufficiently accurate to enable a three-dimensional representation of one or more buildings to be automatically generated.

Data output from the velocity sensor and the accelerometer can be analyzed to determine a final velocity value for a particular instance in time. In an example, the accelerometer can output first acceleration data, and velocity data output by the velocity sensors can be subjected to a differentiation procedure such that second acceleration data is produced. A difference between the first acceleration data output by the accelerometer and the second acceleration data can be determined and a Gaussian filtering procedure can be performed upon such difference. An integration of the resulting filtered data can be undertaken to cause such filtered data to be in the format of velocity. Such filtered data can be used in connection with determining final velocity values for particular instances in time. Additionally, a morphological filter operation can be performed to mitigate/correct errors caused by the Gaussian filtering procedure. Final velocity data can be based at least in part upon results of the Gaussian filter operation and the morphological filter operation.

Other aspects will be appreciated upon reading and understanding the attached figures and description.

DETAILED DESCRIPTION

Figure 1:
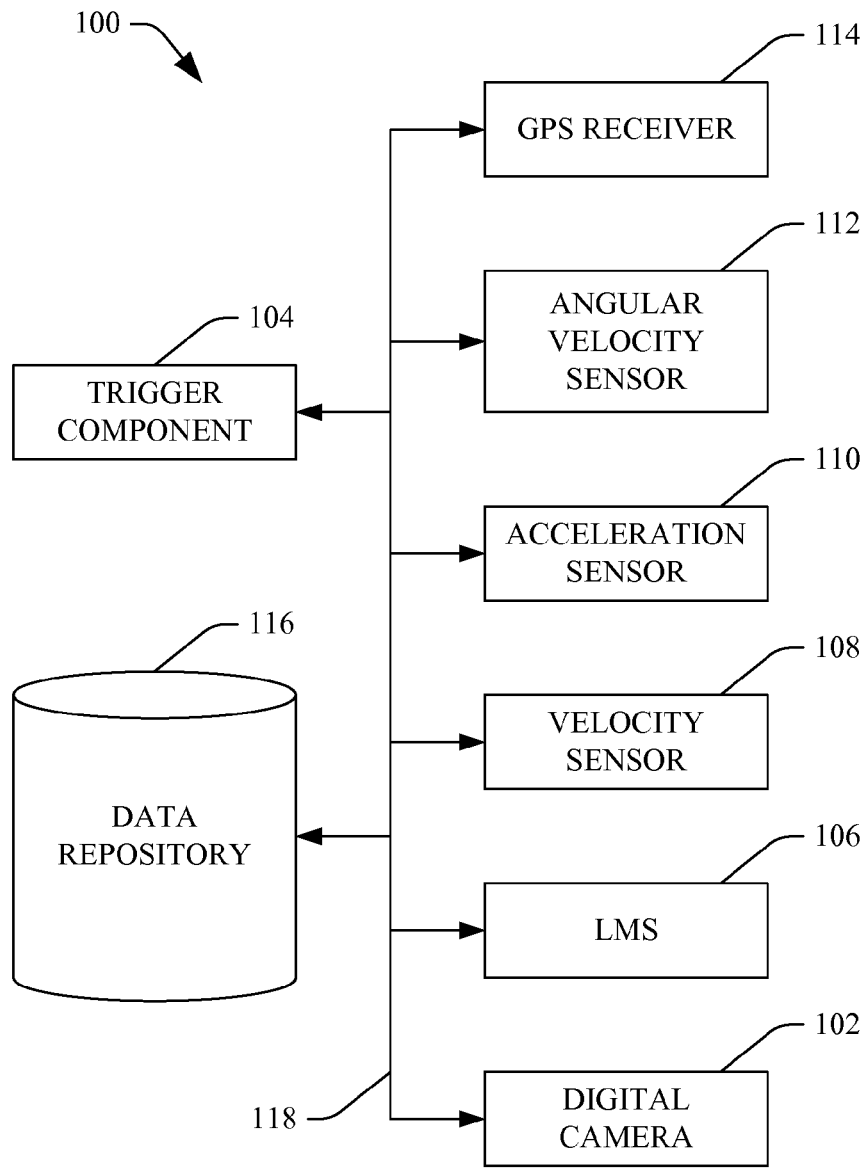
FIG. 1 is a functional block diagram of an example data capture system.

Various technologies pertaining to determining final, accurate velocity values based at least in part upon velocity/acceleration data from different data sources will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example data capture system 100 is illustrated. For instance the data capture system 100 may be configured to be mounted to a vehicle such as an automobile. The data capture system 100 includes a digital camera 102 that is configured to capture images of particular objects in a geographic region such as all or part of various building facades. For instance, the digital camera 102 can be mounted to a vehicle such that the digital camera 102 is configured to capture images in a direction that is substantially orthogonal to the direction of travel of the vehicle.

The data capture system 100 may further include a trigger component 104 that can output trigger signals that cause the digital camera 102 to capture an image. The trigger component 104 and output trigger signals periodically and/or based upon data received from other modules in the data capture system 100. In another example, the trigger component 104 can output a time stamp each time that the trigger component 104 outputs a trigger signal. Thus, for each image captured by the digital camera 102, the trigger component 104 can create a time stamp that indicates a time that the image was captured by the digital camera 102. In another example, the trigger component 104 can be configured to output time stamps upon receipt of a synchronization signal from the digital camera 102 and/or another module in the data capture system 100. Thus, for instance, the digital camera 102 can have internal functionality that causes such digital camera 102 to capture images at particular instances in time. When the digital camera 102 captures an image, the digital camera 102 can transmit a synchronization signal that is received by the trigger component 104 and the trigger component 104 can output a time stamp responsive to receipt of the synchronization signal from the digital camera 102. Thus, again, for each image captured by the digital camera 102, a time stamp generated by the trigger component 104 can correspond to such image.

The data capture system 100 may additionally include a laser measurement system 106 that can be configured to determine a distance from the digital camera 102 to an object that is desirably imaged by the digital camera 102. For instance, the laser measurement system 106 can output a laser scan along a particular plane and can determine one or more distances between the laser measurement system 106 and an object desirably imaged by the digital camera 102 by analyzing a travel time of lasers in the laser scan. The laser measurement system 106 can operate responsive to trigger signals output by the trigger component 104. In another example, the laser measurement system 106 can operate independent of the trigger component 104 and/or may transmit synchronization signals to the trigger component 104.

The data capture system 100 may further include a velocity sensor 108 that is configured to output first velocity data that is indicative of velocity of the vehicle upon which the data capture system 100 is mounted. Pursuant to an example, the velocity sensor 108 can use the Doppler Effect in connection with determining velocity of the vehicle. Thus, the velocity sensor 108 may output one or more radar signals and can determine velocity of the vehicle based at least in part upon reflection characteristics of the radar signals. In an example, the velocity sensor 108 may periodically output velocity values of the vehicle based at least in part upon a clock that is internal to the velocity sensor 108. In another example, the velocity sensor 108 can output velocity values responsive to receipt of a trigger signal from the trigger component 104. In yet another example, the velocity sensor 108 may output synchronization signals to the trigger component 104 to indicate that the velocity sensor 108 has output velocity data.

The data capture system 100 may also include an acceleration sensor 110 (accelerometer) that can output first acceleration data that is indicative of acceleration of the vehicle upon which the data capture system 100 is mounted. For instance, the acceleration sensor 110 may be a MEMs acceleration sensor. The acceleration sensor 110 may output the first acceleration data responsive to receipt of a trigger signal from the trigger component 104 or independently of the trigger component 104. For instance, the acceleration sensor 110 can output first acceleration data periodically using an internal clock or an external clock. Further, the acceleration sensor 110 can output synchronization signals that are received by the trigger component 104, wherein the synchronization signals indicate that the acceleration sensor 110 has output acceleration data.

The data capture system 100 may also include an angular velocity sensor 112 that can determine angular velocity pertaining to the vehicle (e.g., rate of turn in three dimensions). The angular velocity sensor 112 may output data responsive to receipt of trigger signals from the trigger component 104 and/or independent of the trigger component 104. For instance, the angular velocity sensor 112 may be a gyroscope.

The data capture system 100 may also comprise a GPS receiver 114 that can output data that is indicative of a geographic location of the vehicle at a particular instance in time. For instance, the GPS receiver 114 may have an accuracy within approximately 5 meters of an actual location. The GPS receiver 114, for example, can output location data periodically. Additionally or alternatively, the GPS receiver 114 can output location data responsive to receipt of trigger signals from the trigger component 104.

The data capture system 100 may also include a data repository 116 that can receive and retain data output by the digital camera 102, the laser measurement system 106, the velocity sensor 108, the acceleration sensor 110, the angular velocity sensor 112 and/or the GPS receiver 114 and/or the trigger component 104. While not shown or described herein, data output by the data sources 102 to 114 can be synchronized according to a common time base (e.g., a time base used by the trigger component 104 to generate time stamps).

The data sources 102 to 114 may be in communication with the data repository 116, the trigger component 104 and/or themselves by way of a communications channel 118. For instance, the communications channel 118 may be a serial communications interface or channel. In another example the communications channel 118 may be a wireless channel, or other suitable channel/interface, etc.

In operation, the data capture system 100 can be mounted to an automobile. As the automobile traverses one or more streets, the digital camera 102 can capture images of building facades in a direction that is substantially orthogonal to the direction of travel of the automobile. The laser measurement system 106, the velocity sensor 108, the acceleration sensor 110, the angular velocity sensor 112 and the GPS receiver 114 can output data as the automobile travels such that metadata corresponds to digital images captured by the digital camera 102. Captured images and corresponding metadata can be synchronized and stored in the data repository 116. A three-dimensional representation of a geographic region traversed by the automobile (and thus the data capture system 100) can be automatically generated using such images and corresponding metadata.

To enable automatic generation of the three-dimensional representation, sufficiently accurate velocity data may be required. The velocity sensor 108 and the acceleration sensor 110, however, may be relatively inexpensive sensors and thus may output velocity and acceleration data, respectively, that is somewhat inaccurate. For instance, the velocity sensor 108 may output velocity data that includes errors when the automobile is traveling at low speeds (e.g., 0 to 5 m/s).

Figure 4:
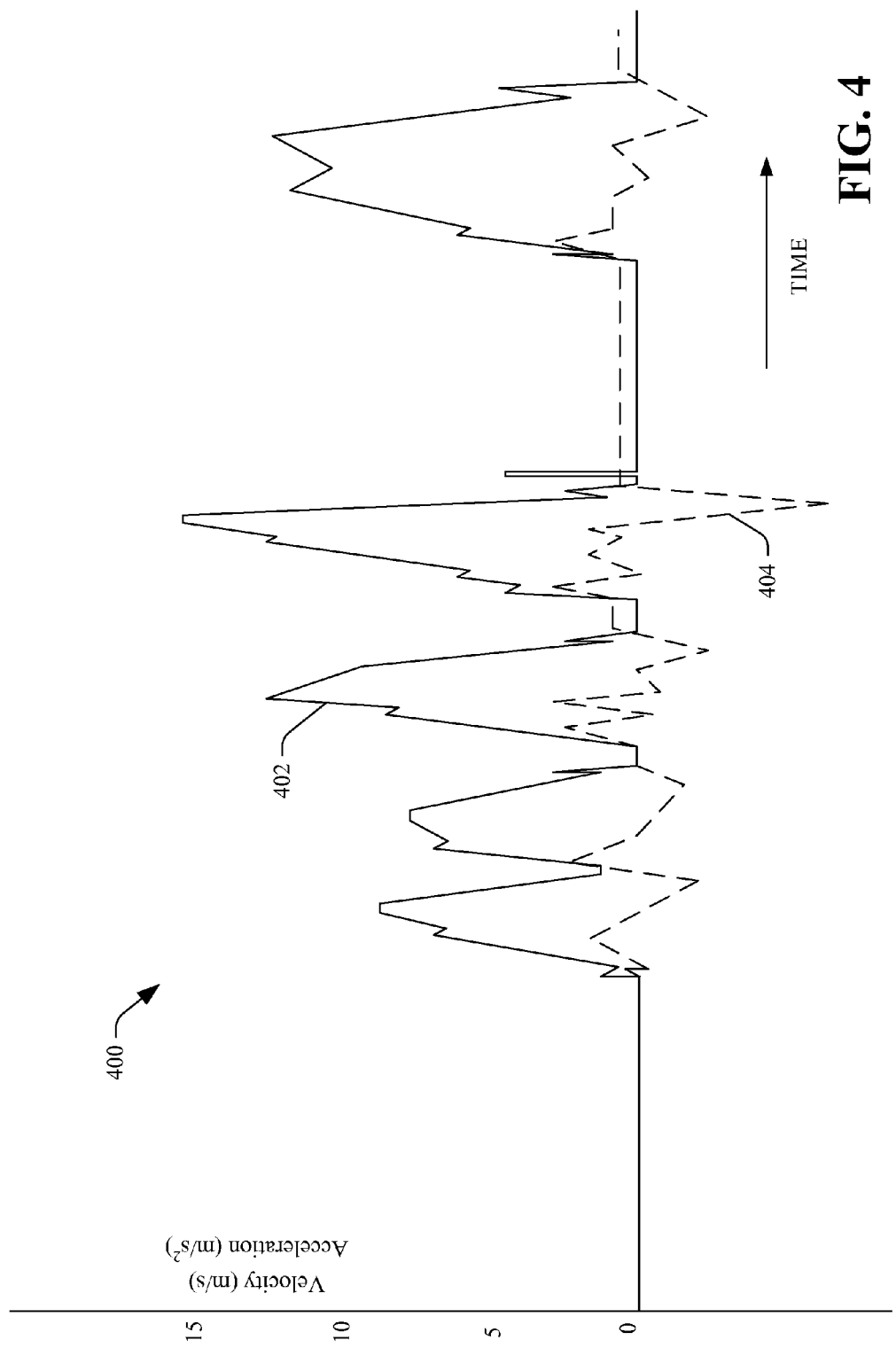
FIG. 4 is an example graphical representation of acceleration data versus velocity data from an acceleration sensor and a velocity sensor, respectively.

Referring briefly to FIG. 4, an example graphical depiction of velocity data 402 output by the velocity sensor 108 and acceleration data 404 output by the acceleration sensor 110 is shown. As can be discerned, the velocity data 402 includes errors when the automobile is at low speeds, and the errors are in the form of spikes in velocity over relatively short periods of time. Additionally, the acceleration data 404 may include offset errors over time. As can be discerned, over time the acceleration data 404 output by the acceleration sensor 110 may be offset such that when the automobile has 0 acceleration, the acceleration sensor 110 may output acceleration values of 0.1 m/s$^2$, or greater. The acceleration data 404 output by the acceleration sensor 110 can be subject to an integration procedure such as to create velocity data. If data output by the accelerometer (which has an offset error) is integrated over time, such resulting velocity data will include drift error.

Velocity data from the velocity sensor 108 or velocity data ascertained from acceleration data output by the acceleration sensor 110 individually, however, may not be sufficiently accurate to enable automatic generation of a three-dimensional representation of a geographic region. As will be described in greater detail herein, however, data output by the acceleration sensor 110 and the velocity sensor 108 may be used in combination to determine velocity data for the automobile that is sufficiently accurate to enable automatic generation of a three-dimensional representation of a geographic region.

Figure 2:
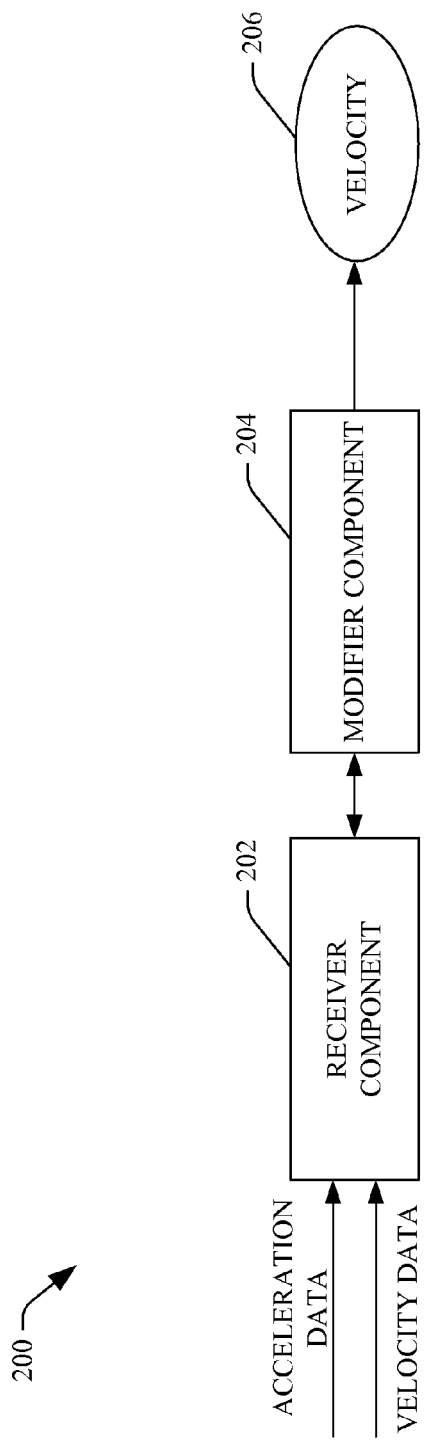
FIG. 2 is a functional block diagram of an example system that facilitates determining velocity values for a vehicle at different instances in time.

Referring now to FIG. 2, an example system 200 that facilitates determining final velocity data based at least in part upon acceleration data from the acceleration sensor 110 and velocity data from the velocity sensor 108 is illustrated. For instance, the system 200 can operate as data is received or as a post processing system. The system 200 includes a receiver component 202 that receives first acceleration data output by the acceleration sensor 110 and first velocity data output by the velocity sensor 108 as the data capture system 100 is in operation. For instance, the automobile on which the data capture system 100 is mounted may be traveling over one or more streets (e.g., accelerating, decelerating, stopping, etc.).

The system 200 further includes a modifier component 204 that can analyze the first acceleration data and the first velocity data and can output final velocity data 206 based at least in part upon the analysis. As will be described in greater detail below, the modifier component 204 can perform an integration on the first acceleration data to generate second velocity data. The modifier component 204 can also perform a differentiation on the first velocity data to generate second acceleration data. The modifier component 204 can determine first difference data which is a difference between the first acceleration data and the second acceleration data and can determine the final velocity data 206 based at least in part upon such first difference data. Furthermore, the modifier component can determine second difference data, which is a difference between the first velocity data and the second velocity data.

In an example, the modifier component 204 can perform a Gaussian filtering procedure on the first difference data to generate first filtered data. Sigma values used in the Gaussian filter may vary depending upon an amount of change in the difference between the first acceleration data and the second acceleration data over a particular period of time. The result of the Gaussian filter procedure can be used in connection with determining the final velocity data 206.

In an example, the modifier component 204 can perform an integration on the first filtered data to generate second filtered data. The second difference data may then be subtracted from the second filtered data to generate third difference data, and the third difference data can be subjected to a morphological filtering procedure to create third filtered data. The modifier component 204 may then add the results of the morphological filtering procedure (third filtered data) with the second filtered data to generate fourth filtered data, and can subtract the fourth filtered data from the second velocity data to create the final velocity data 206. This final velocity data 206 may then be stored in correspondence to one or more images captured by the digital camera 102. In another example, the final velocity data 206 may be used with other data captured by the data capture system 100 to determine relatively precise location data for each image captured by the digital camera 102.

While the system 200 is described in connection with linear velocities and accelerations, it is to be understood that the system 200 can be adapted for other combinations of heterogeneous sensors. For instance, the system 200 can determine final angular velocity values based at least in part upon data from an orientation sensor (such as a GPS sensor that outputs GPS track over ground (TOG) measurements) and data from an angular velocity sensor such as a gyroscope.

Figure 3:
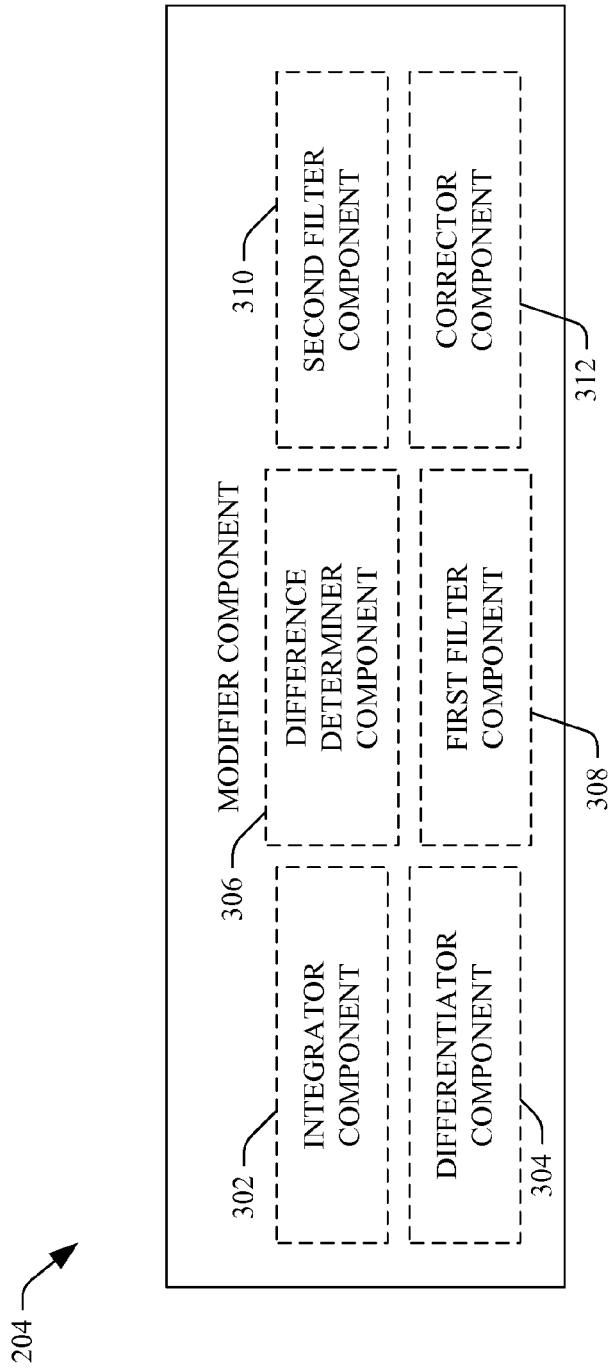
FIG. 3 is a functional block diagram of an example component that facilitates determining final velocity values of a vehicle based at least in part upon received velocity data and received acceleration data from different sensors.

Referring now to FIG. 3, operation of the modifier component 204 is described in greater detail. The modifier component 204 can include an integrator component 302 that receives the first acceleration data generated by the acceleration sensor 110 and performs an integration on such data to create second velocity data. The modifier component 204 can also include a differentiator component 304. The differentiator component 304 can receive first velocity data output by the velocity sensor 108 and can perform a differentiation on such data to create second acceleration data. Thus, the modifier component 204 can have access to first velocity data corresponding to the velocity sensor 108 and second velocity data corresponding to the acceleration sensor 110 and can further have access to first acceleration data corresponding to the acceleration sensor 110 and second acceleration data corresponding to the velocity sensor 108.

Referring briefly to FIG. 4, the graphical representation 400 of first velocity data 402 output by the velocity sensor 108 together with first acceleration data 404 output by the acceleration sensor 110 is shown. As can be discerned and as has been noted above, the first velocity data 402 can include errors when the vehicle is traveling at relatively low speeds or is stopping while the first acceleration data 404 can include offset errors. The first velocity data 402 is shown as a solid line while the first acceleration data 404 is shown as a dashed line.

Figure 5:
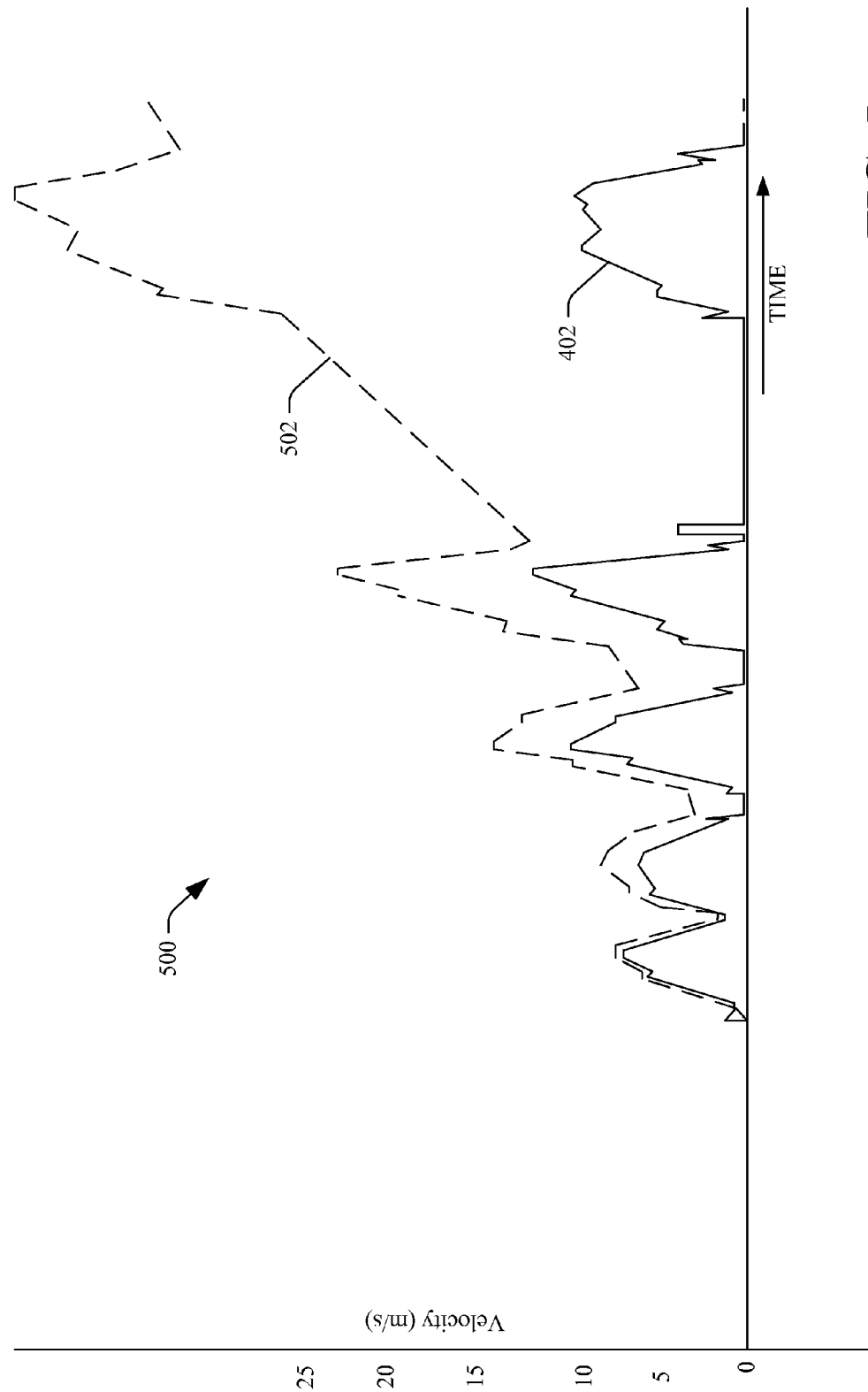
FIG. 5 is an example graphical representation of velocity data from different data sources.

Turning to FIG. 5, a graphical representation 500 of the first velocity data 402 versus the second velocity data 502 (as generated by the integrator component 302) is illustrated. The first velocity data 402 is shown in the graphical representation 500 as a solid line while the second velocity data 502 is shown as a dashed line. As noted previously, the first velocity data 402 may include errors when the automobile is at a standstill or travelling at low speeds. Furthermore, due to offset errors pertaining to the acceleration sensor 110, the second velocity data 502 includes drift errors over time as shown in the graphical representation 500. It can also be discerned that apart from the drift errors in the second velocity data 502 and the errors in the first velocity data 402, there is a general correspondence between the first velocity data 402 and the second velocity data 502.

Figure 6:
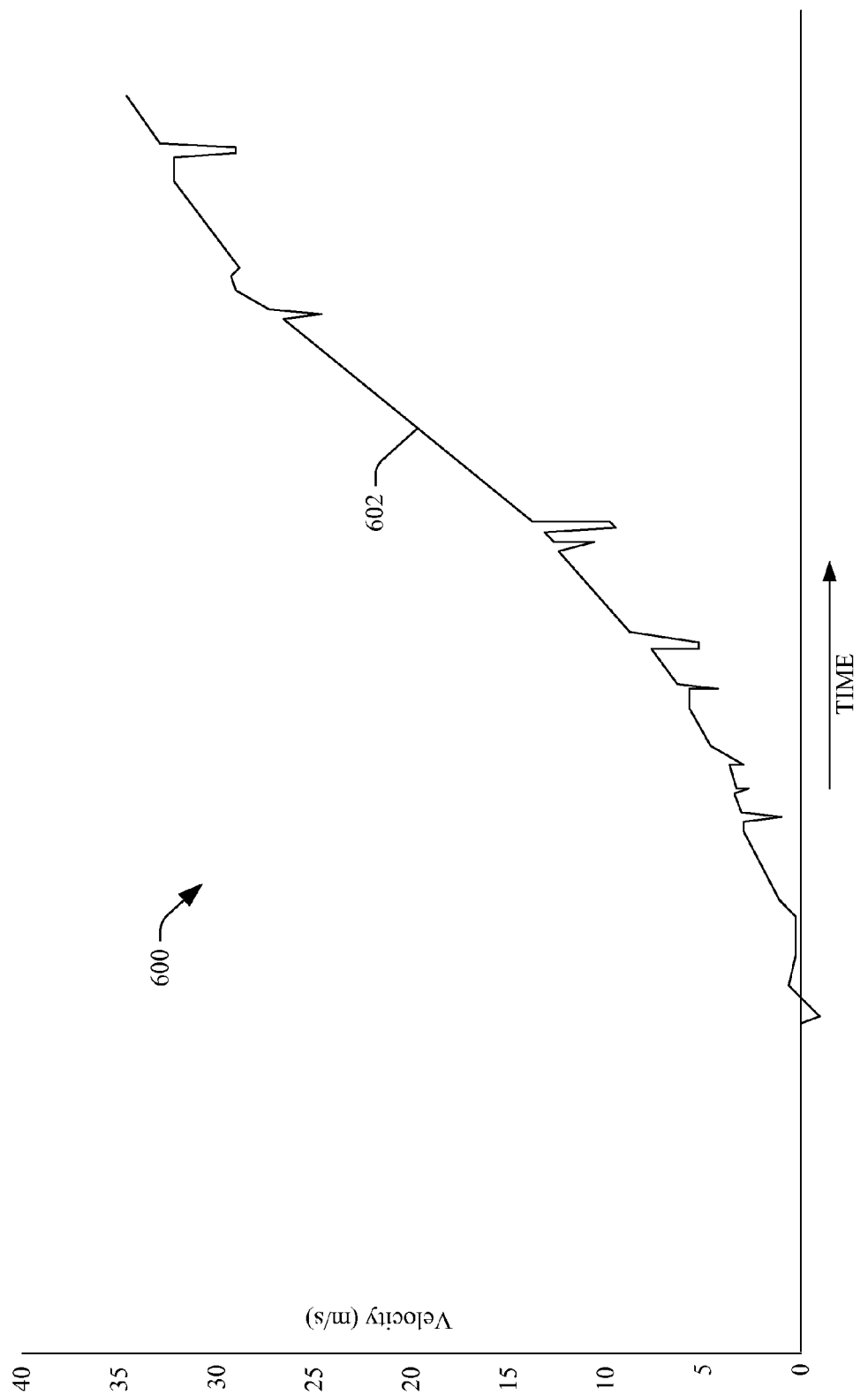
FIG. 6 is a graphical representation of a difference between the velocity data of FIG. 5.

Referring now to FIG. 6, a graphical depiction 600 of a difference 602 (second difference data) between the first velocity data 402 and the second velocity data 504 is shown. Such difference is represented by a solid line. The difference 602 illustrates both drift errors in the second velocity data 504 (due to offset errors of the acceleration sensor 110) as well as errors pertaining to the velocity sensor 108 (which are "spikes" in the difference 602).

Figure 7:
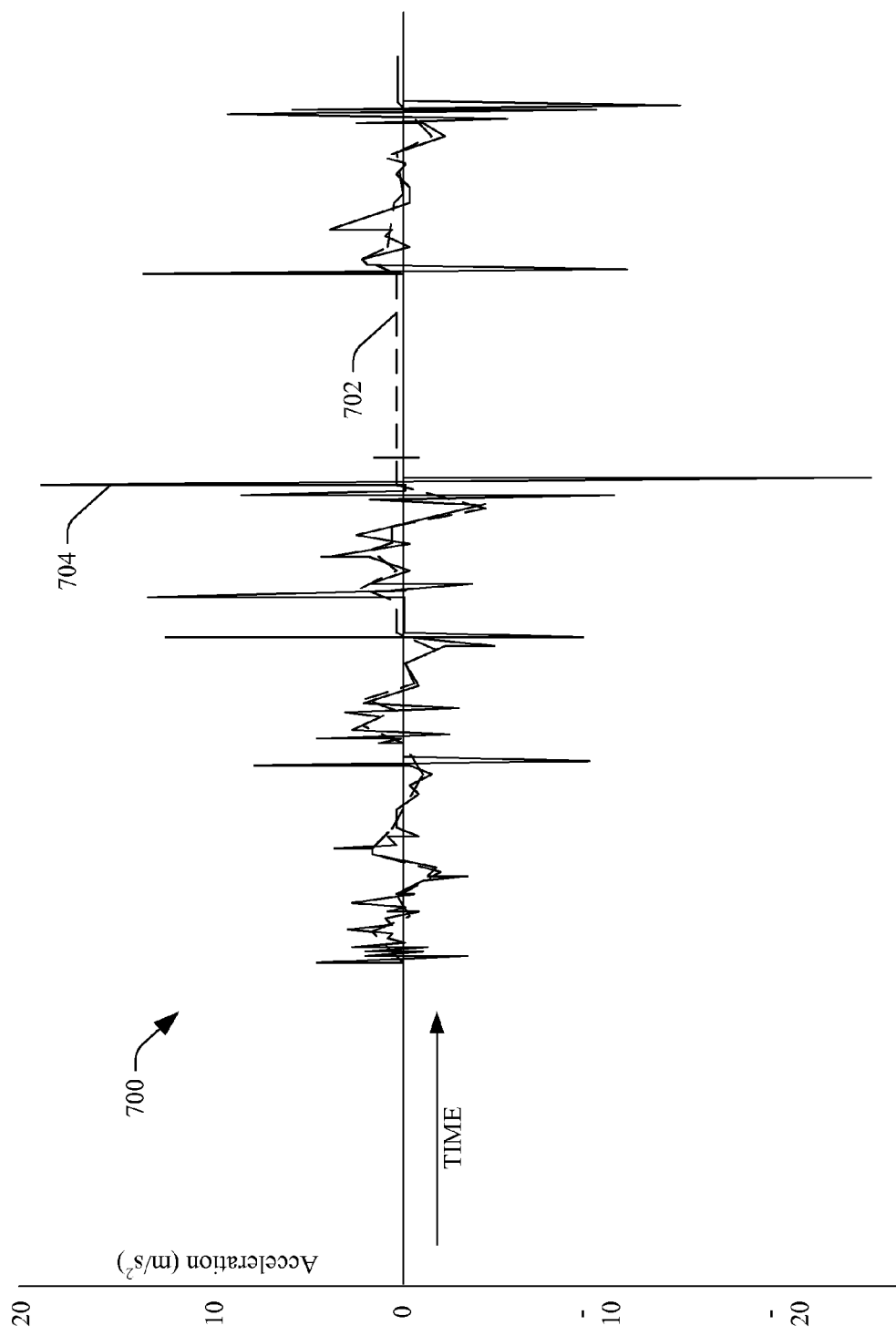
FIG. 7 is an example graphical representation of acceleration data between two sources.

Referring now to FIG. 7, a graphical depiction 700 of the first acceleration data 702 (output by the acceleration sensor 110) and the second acceleration data 704 (differentiated from the velocity data) is illustrated. The first acceleration data 702 is represented by a dashed line while the second acceleration data 704 is represented by a solid line. Errors in the first velocity data 402 generated by the velocity sensor 108 can be seen in the second acceleration data 704 as relatively large spikes in the data.

Returning to FIG. 3, the modifier component 204 additionally includes a difference determiner component 306 that can determine differences between the first acceleration data and the second acceleration data (first difference data) and/or differences between the first velocity data and the second velocity data (second difference data). For instance, the difference determiner component 306 can determine differences between the first acceleration data and the second acceleration data over a particular amount of time at one or more instances in time.

Figure 8:
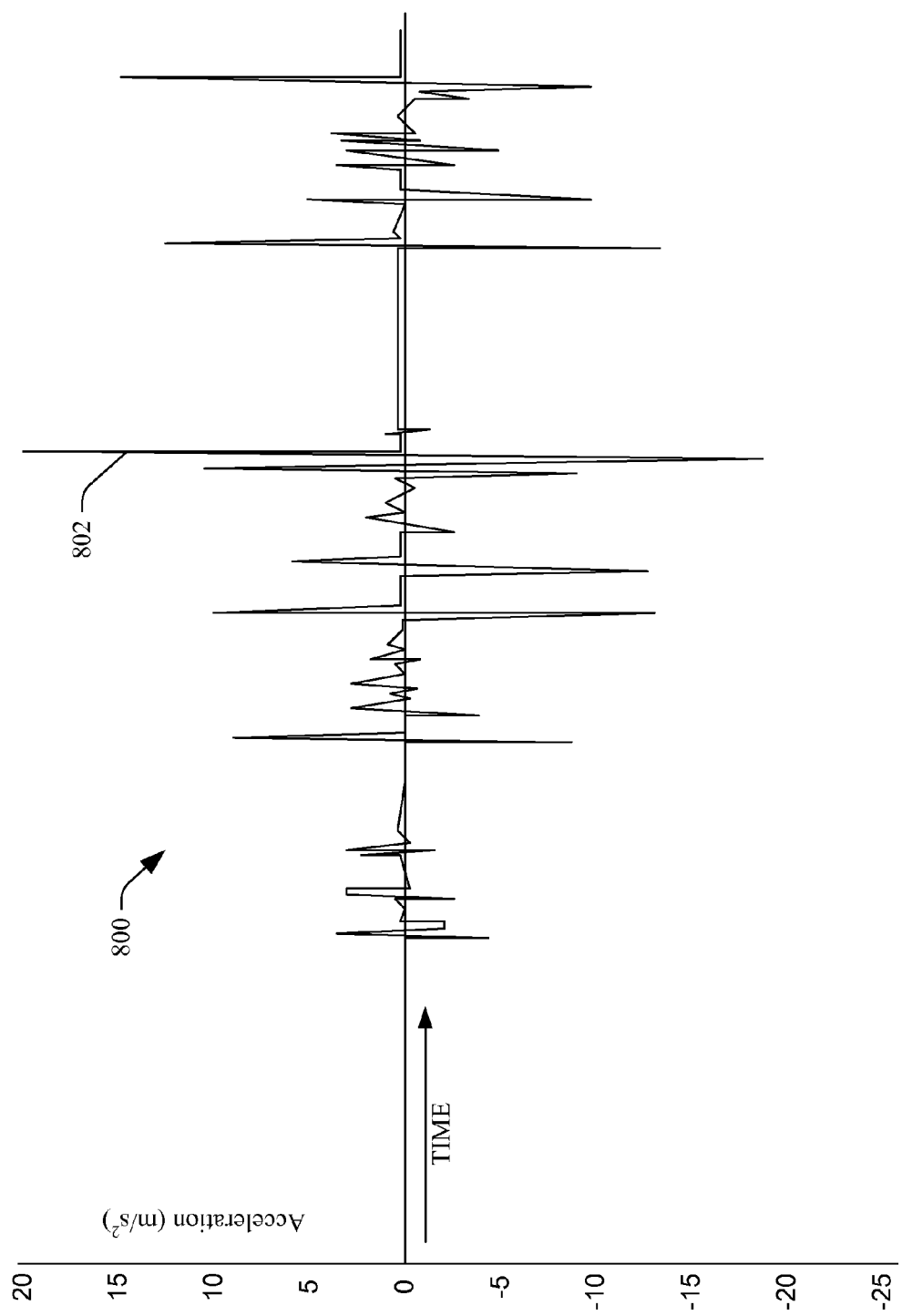
FIG. 8 is a graphical representation illustrating a difference between acceleration data from two data sources.

Turning to FIG. 8, an example graphical representation 800 of a difference 802 (first difference data) between the first acceleration data 702 and the second acceleration data 704 is illustrated. If the first velocity data 402 and the first acceleration data 702 include no errors, the first difference data determined by the difference determiner component 306 would be zero for all instances in time. Due to errors, however, in such data (e.g., caused by manufacturing errors in connection with the velocity sensor 108 and/or the acceleration sensor 110), the first difference data 802 is non-zero.

Turning back to FIG. 3, the modifier component 204 can also include a first filter component 308 that can perform a Gaussian filter operation on the first difference data determined by the difference determiner component 306 to generate first filtered data. In an example, the sigma value for the Gaussian filter used by the first filter component 308 can be a predefined constant value which may be ascertained empirically. In another example, the sigma value for the Gaussian filter operation used by the first filter component 308 on the first difference data can vary based at least in part upon a rate of change in the first difference data over a particular period of time. Thus, for instance, the greater the rate of change, the greater the sigma value. In effect, the first filter component 308 can operate to reduce/mitigate errors in the first velocity data 402 output by the velocity sensor 108. However, offset errors corresponding to the first acceleration data may remain.

Figure 9:
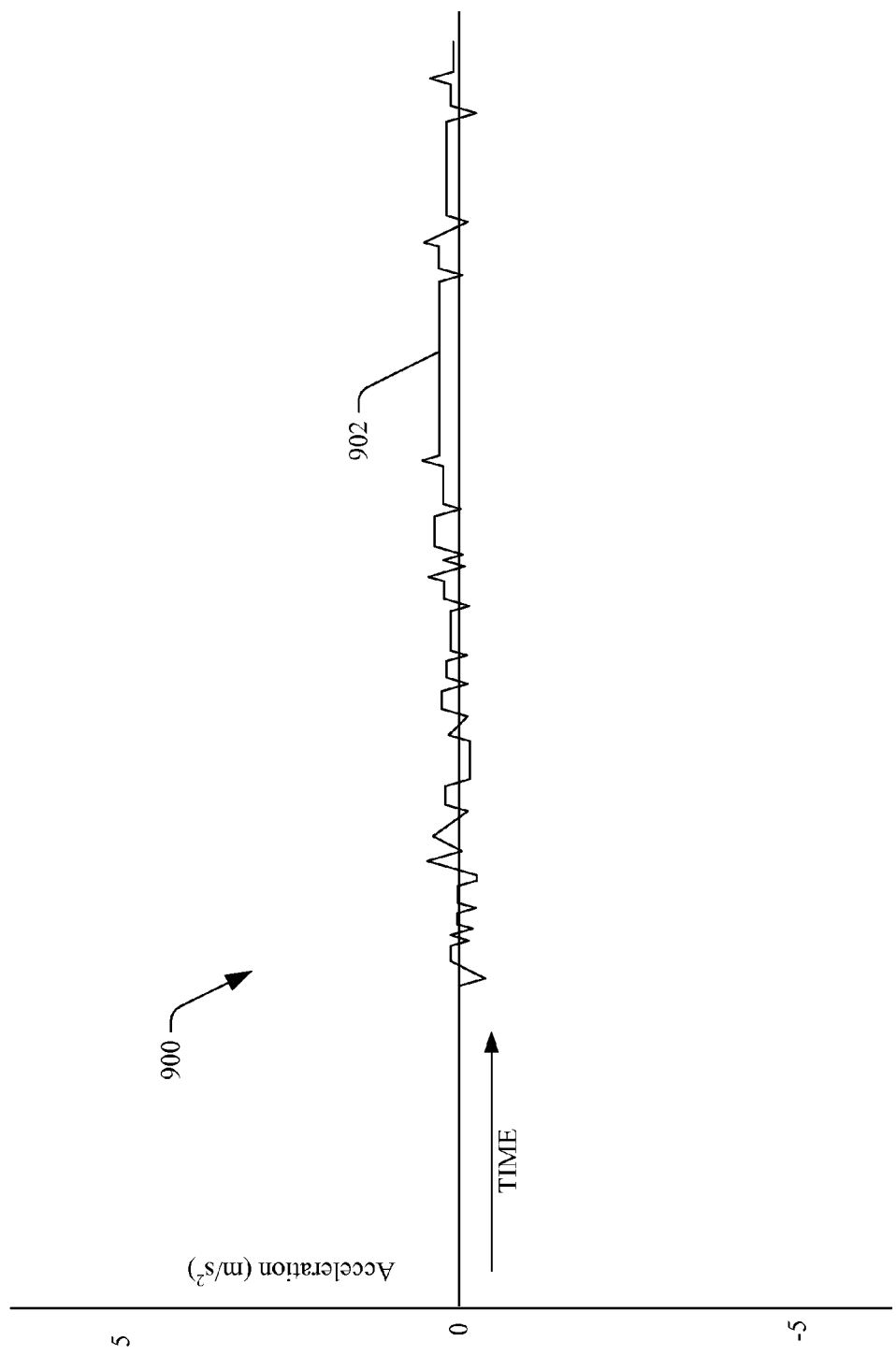
FIG. 9 is a graphical representation of a filtered difference between the acceleration data of FIG. 8.

Referring briefly to FIG. 9, a graphical representation 900 of the result of the Gaussian filter procedure (the first filtered data) on the first difference data is illustrated. The first filtered data can be represented by the solid line in the graphical representation 900. As can be discerned, many of the spikes in the first difference data caused by errors in the first velocity data 402 have been removed during the filtering operation. Offset errors in the first acceleration data, however, may remain as can be viewed as time progresses.

Returning again to FIG. 3, the integrator component 302 can perform an integration on the first filtered data to generate second filtered data that is in the form of a velocity. The difference determiner component 306 may then determine a difference between the second filtered data and the second difference data to generate third difference data.

Figure 10:
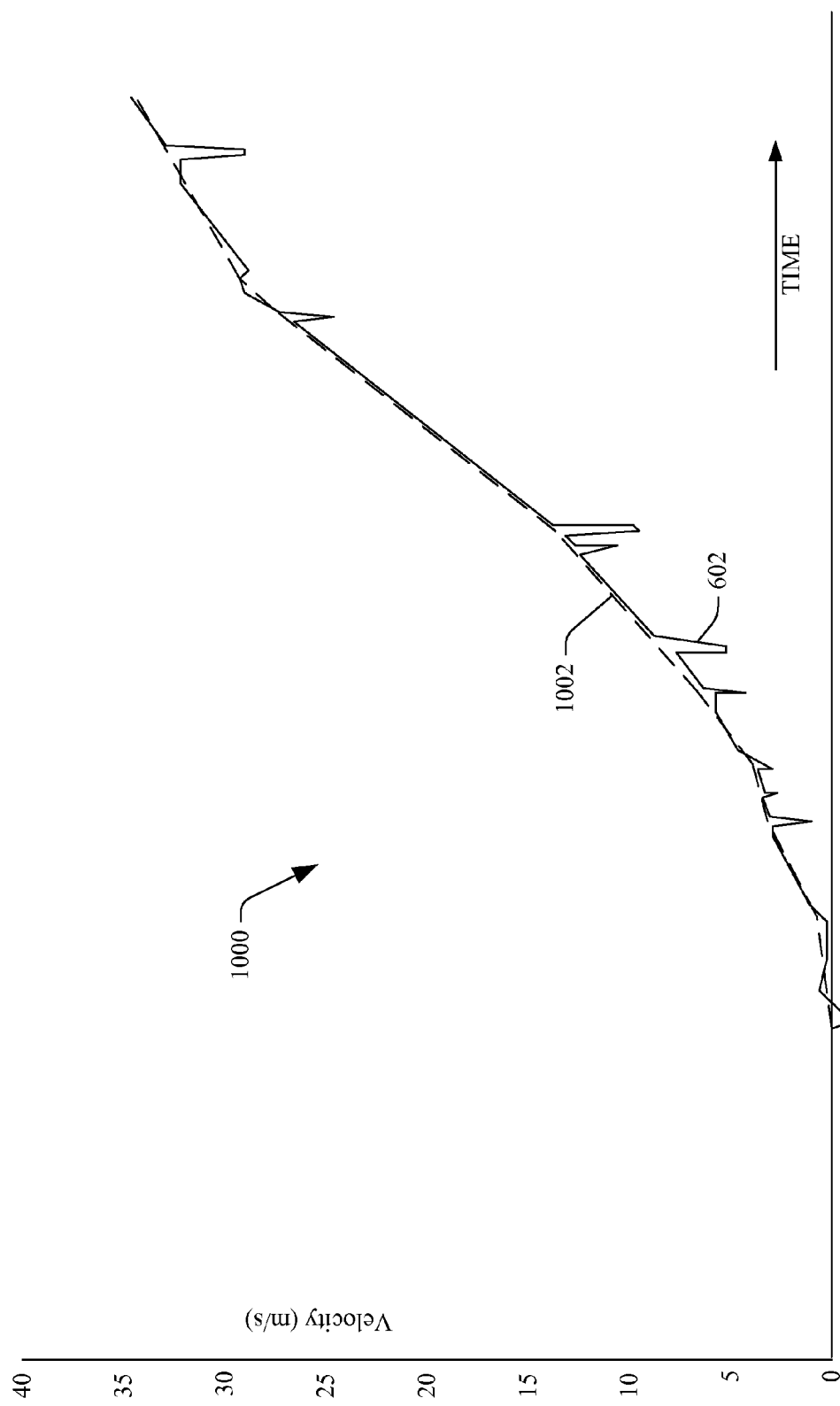
FIG. 10 illustrates a difference between filtered velocity data and unfiltered velocity data.

Referring now to FIG. 10, an example graphical depiction 1000 of the second filtered data 1002 versus the second difference data 602 is illustrated. The second difference data 602 is depicted by a solid line while the second filtered data 1002 is depicted by a dashed line. As can be ascertained, the second filtered data 1002 does not include errors pertaining to the first velocity data but generally represents offset errors corresponding to the first acceleration data output by the acceleration sensor 110.

Returning to FIG. 3, the modifier component 204 may further include a second filter component 310 that can perform a morphological filter operation on the second difference data determined by the difference determiner component 306. Such morphological filter operation can be performed to mitigate/correct errors resulting from the Gaussian filter operation performed by the first filter component 308. Data resulting from the morphological filter operation performed by the second filter component 310 can be referred to hereinafter as third filtered data.

Figure 11:
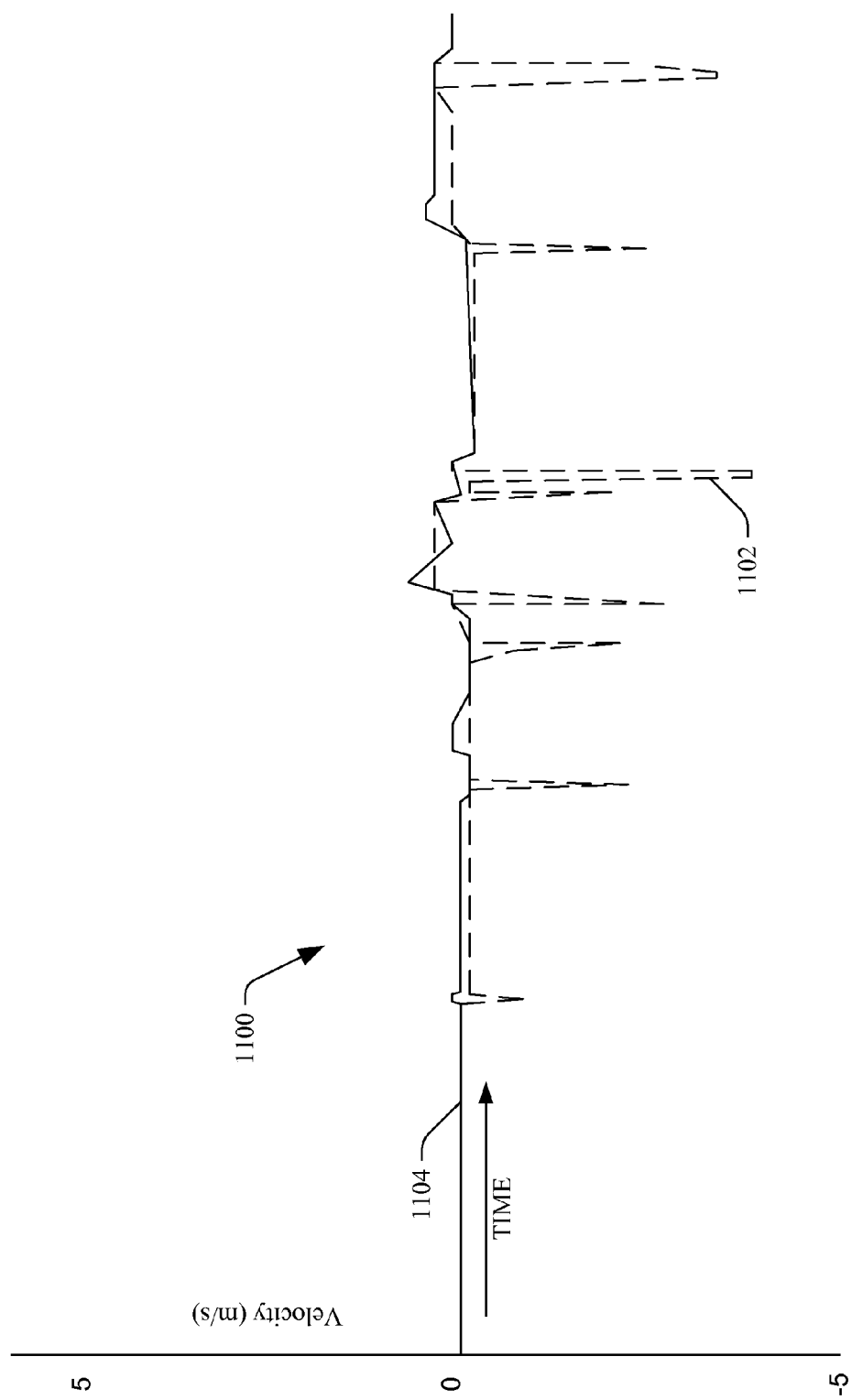
FIG. 11 includes a graph that is representative of a difference between velocity data and filtered velocity data and further illustrates a morphological filtering operation.

With reference to FIG. 11, an example graphical representation 1100 of the third difference data 1102 and data that can be used in connection with a morphological filter operation 1104 are illustrated. The third difference data 1102 is depicted by a dashed line and the data that can be used in connection with a morphological filter operation 1104 is depicted by a solid line.

The modifier component 204 can also include a corrector component 312 which can add the third filtered data with the second filtered data to create fourth filtered data. The corrector component 312 may then subtract the fourth filtered data from the second velocity data to create the final velocity data 206 (FIG. 2). The final velocity data 206 will not include local errors/glitches from pertaining to the velocity sensor 108 and for offset errors corresponding to the acceleration sensor 110.

Figure 12:
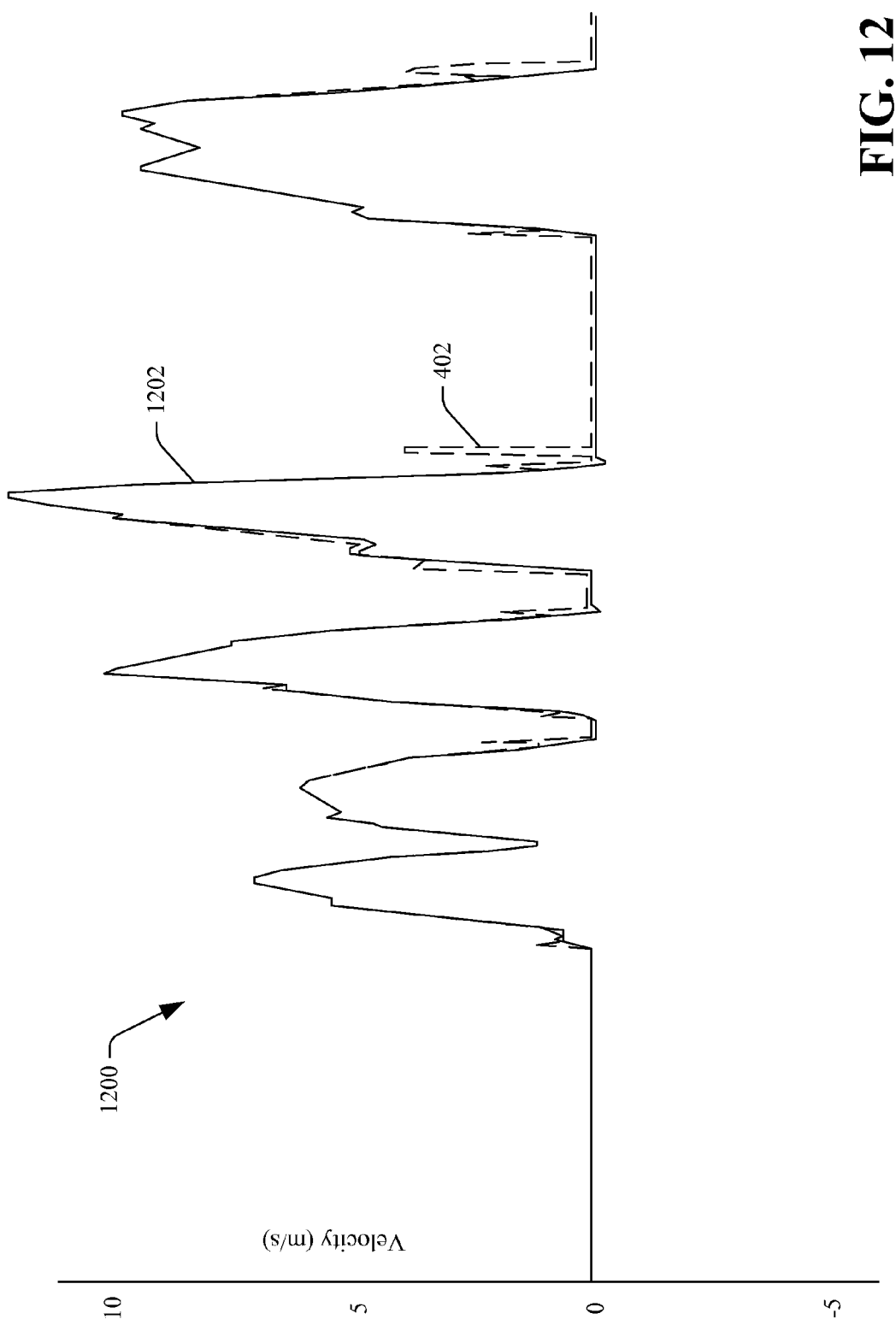
FIG. 12 illustrates a difference between final velocity values and additional velocity values output by a velocity sensor.

Referring briefly to FIG. 12, an example graphical depiction 1200 of the first velocity data 402 versus final velocity data 1202 is depicted. The first velocity data 402 is represented by a dashed line while the final velocity data 1202 is represented by a solid line. As can be discerned, the final velocity data 1202 does not include the glitches pertaining to the first velocity data 402 or drift errors corresponding to the second velocity data (depicted in FIG. 5).

With reference now to FIGS. 13-16, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Figure 13:
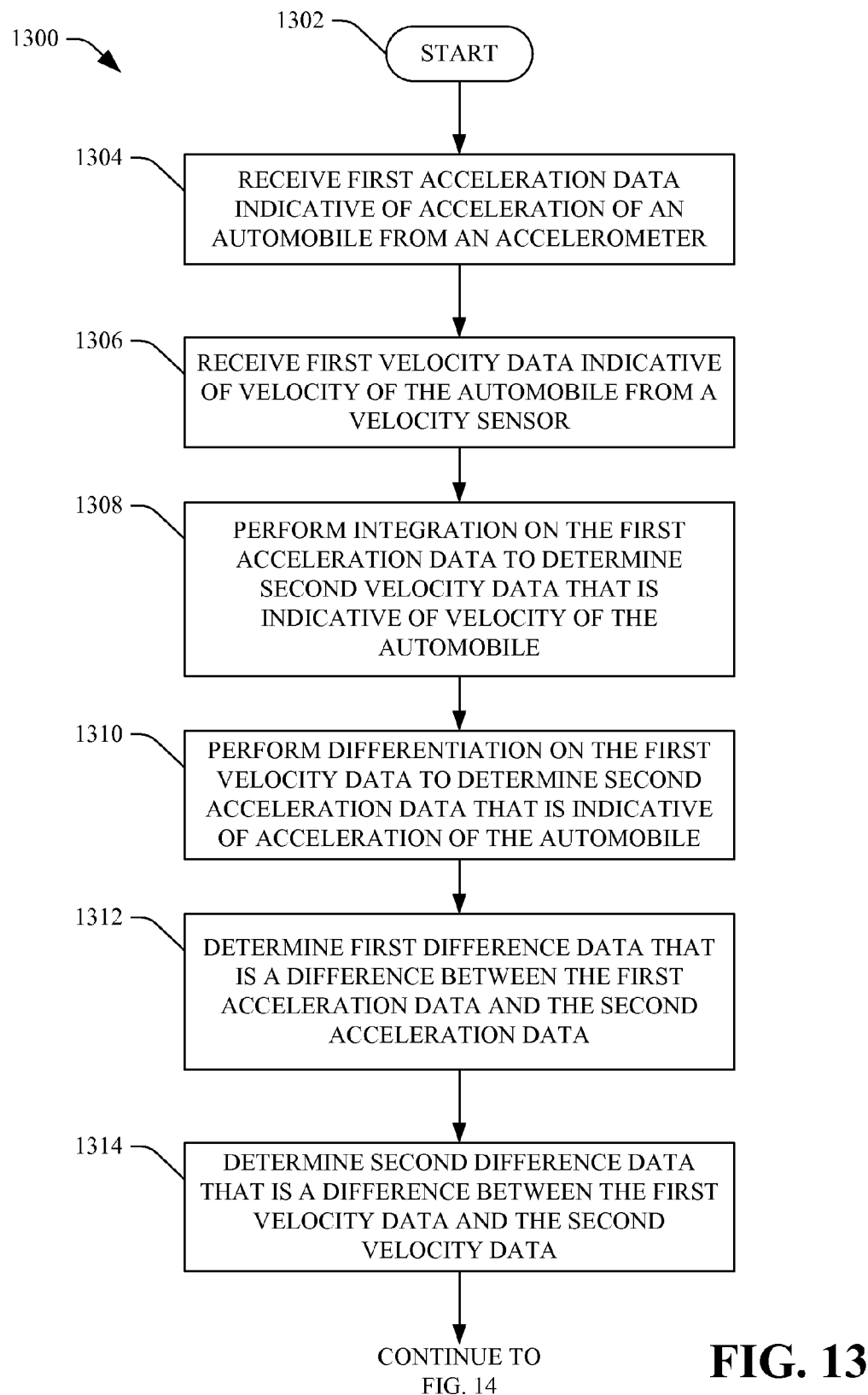
FIG. 13 is a flow diagram that illustrates an example methodology for determining final velocity data of a vehicle based at least in part upon velocity/acceleration data from separate data sources.

Referring now to FIG. 13, a methodology 1300 that facilitates determining final velocity values for an automobile based at least in part upon data from multiple sensors is illustrated. The methodology 1300 begins at 1302, and at 1304 first acceleration data is received, wherein the first acceleration data is indicative of acceleration of an automobile. The first acceleration data can, for instance, be received from an accelerometer such as a MEMs acceleration sensor. Moreover, the first acceleration data can be received over a particular period of time such as in the order of 5 minutes.

At 1306, first velocity data is received, wherein the first velocity data is indicative of velocity of the automobile over a particular period time. The first velocity data can be received from a velocity sensor such as a velocity sensor that employs the Doppler effect in connection with determining the first velocity data.

At 1308, an integration is performed on the first acceleration data to determine second velocity data, wherein the second velocity data is indicative of velocity of the automobile over the particular period of time. Thus, two sets of velocity data are created: a first set that corresponds to the velocity sensor and a second set that corresponds to the acceleration sensor.

At 1310, a differentiation is performed on the first velocity data to determine second acceleration data, wherein the second acceleration data is indicative of acceleration of the automobile over the particular period of time. Thus, two sets of acceleration data are obtained: a first set that corresponds to the acceleration sensor and a second set that corresponds to the velocity sensor.

At 1312, first difference data is determined, wherein the first difference data is a difference between the first acceleration data and the second acceleration data.

At 1314, second difference data is determined, wherein the second difference data is a difference between the first velocity data and the second velocity data. The first and second difference data, for instance, can be at least temporarily stored in memory and/or a data repository.

Figure 14:
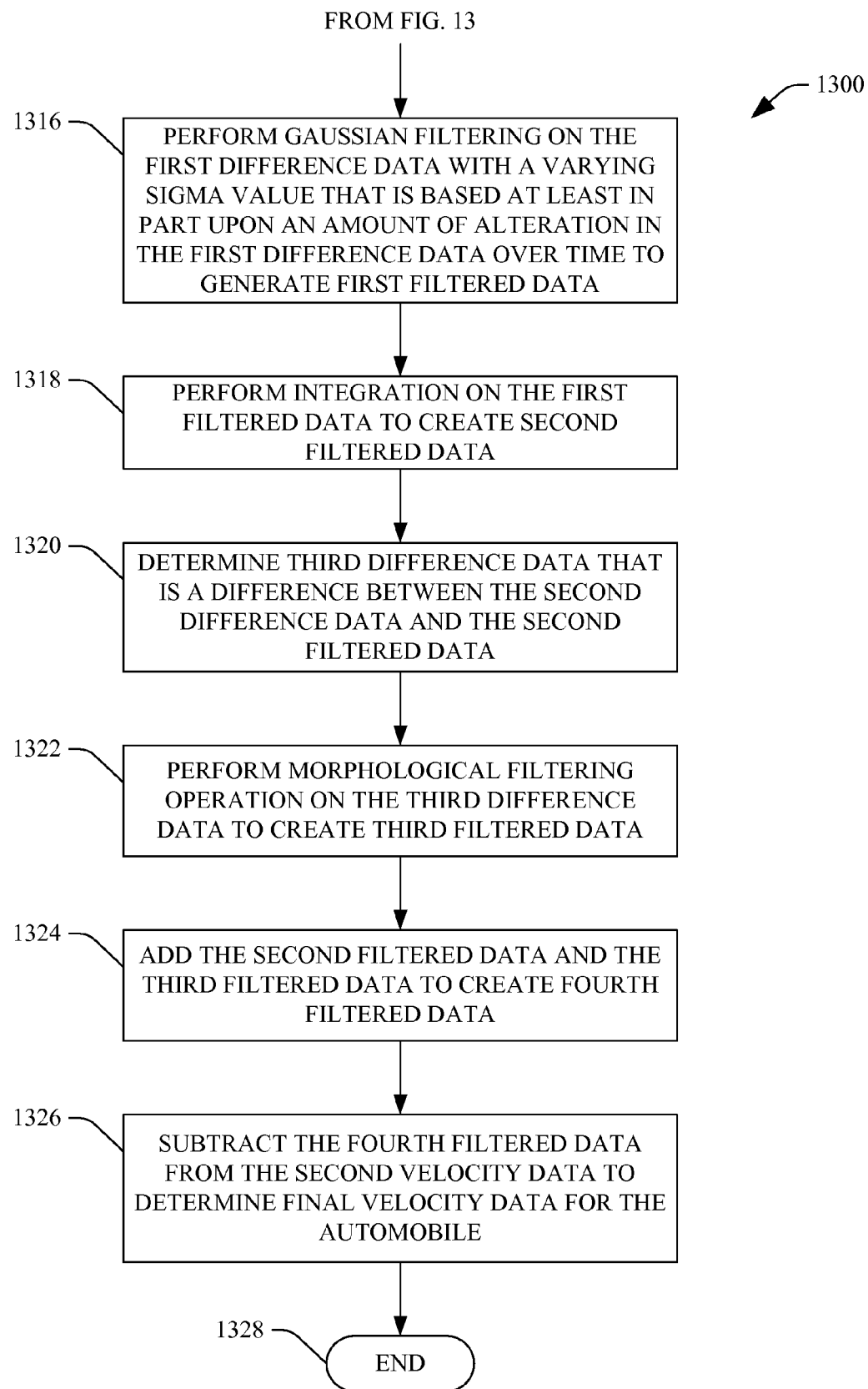
FIG. 14 is a flow diagram that illustrates an example methodology for computing final velocity data for a vehicle.

With reference to FIG. 14, the methodology 1300 continues, and at 1316 Gaussian filtering is performed on the first difference data with a varying sigma value. The varying sigma value can be based at least in part upon an amount of alteration in the first difference data over time. The Gaussian filtering with a varying sigma value causes creation of first filtered data.

At 1318, an integration is performed upon the first filtered data to create second filtered data. For instance, the second filtered data can be generally representative of a drift error that can occur when integrating data output by the acceleration sensor (e.g., the second velocity data integrated from the first acceleration data).

At 1320, third difference data is determined, wherein the third difference data is the difference between the second difference data and the second filtered data.

At 1322, a morphological filtering operation is performed on the third difference data to create third filtered data. The act of 1322 can be performed to correct/mitigate errors introduced by the Gaussian filtering operation of act 1316.

At 1324, the second filtered data is added to the third filtered data to create fourth filtered data. For instance, the fourth filtered data can be representative of drift errors corresponding to offset errors in data output by the accelerometer, and can be in the format of a velocity (e.g., m/s).

At 1326, the fourth filtered data is subtracted from the second velocity data to create final velocity data which is indicative of the velocity of the automobile. The final velocity data can be relatively accurate and may not include errors corresponding to the velocity sensor and/or the acceleration sensor. For instance, the final velocity data or portions thereof can correspond to one or more images captured by a data capture system such as the data capture system 100 (FIG. 1). Moreover, the final velocity data can be bundled with other data and be used in connection with determining a relatively precise location of the automobile at particular points in time (e.g., points in time that correspond with when images have been captured). The methodology 1300 completes at 1328.

Figure 15:
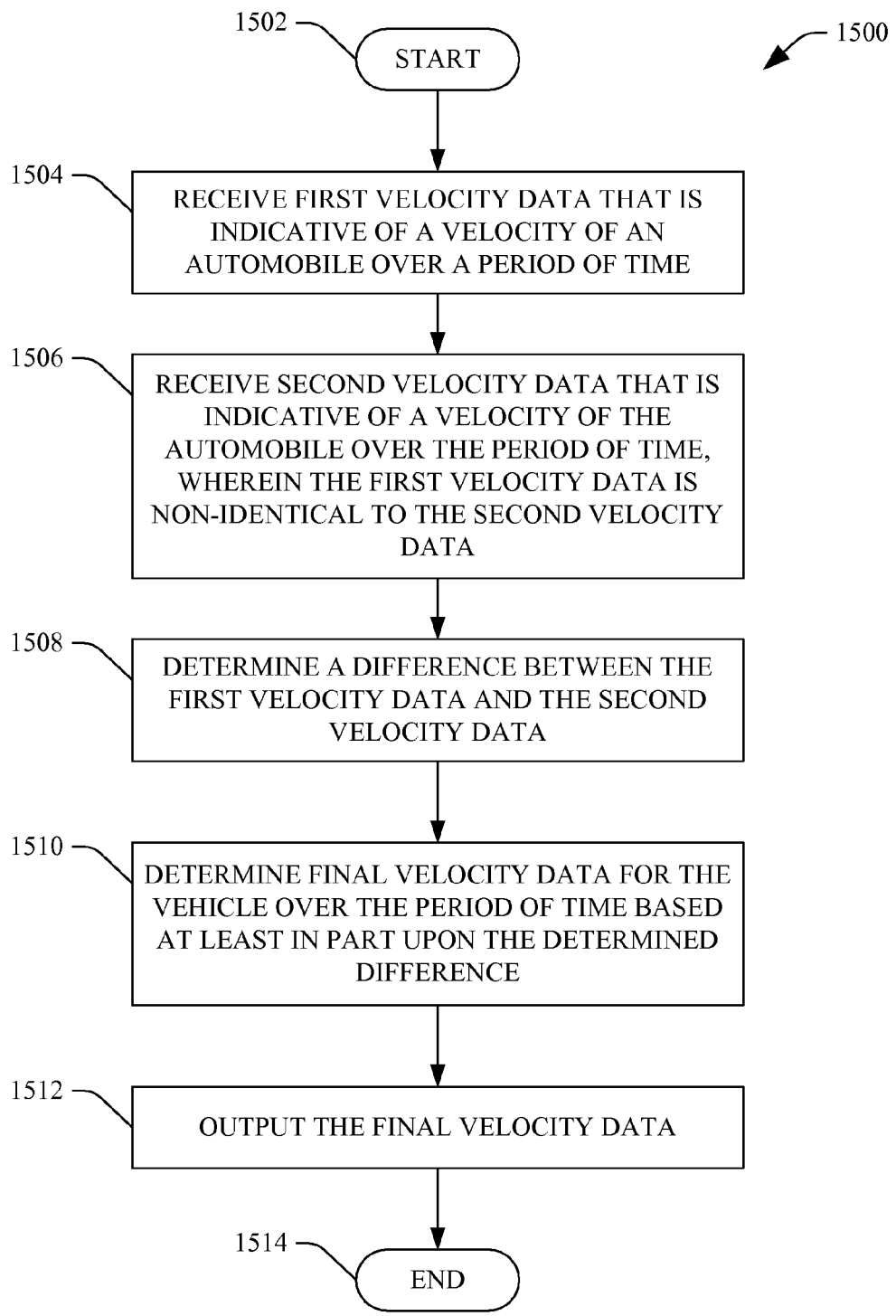
FIG. 15 is a flow diagram that illustrates an example methodology for determining final velocity data for a vehicle.

With reference now to FIG. 15, an example methodology 1500 that facilitates determining final velocity data of a vehicle based at least in part upon data from multiple acceleration/velocity data sources is illustrated. The methodology 1500 starts at 1502, and at 1504 first velocity data is received that is indicative of a velocity of an automobile over a particular period of time. For instance, the first velocity data may be received from a sensor that is configured to directly detect velocity data, such as a sensor that is configured to use the Doppler Effect in connection with determining velocity data.

At 1506, second velocity data is received, wherein the second velocity data is indicative of a velocity of the automobile over a period of time. Furthermore, the second velocity data can be non-identical to the first velocity data. For instance, the second velocity data can be derived from acceleration data generated by an acceleration sensor.

At 1508, a difference is determined between the first velocity data and the second velocity data. At 1510, final velocity data is determined that is a velocity of the vehicle over the period of time, wherein the final velocity data is determined based at least in part upon the difference determined at act 1508. For instance, the determined difference or a differentiation thereof can be subjected to a filtering operation that can be used to approximately model errors in one or more of the sensors that captured the first velocity data and/or or the second velocity data.

At 1512 the final velocity data is output. For instance, the final velocity data may be output through a computer readable medium such as a data store. In another example the final velocity data can be output to a display screen of a display device such as a computer display device. The methodology 1500 competes at 1514.

Figure 16:
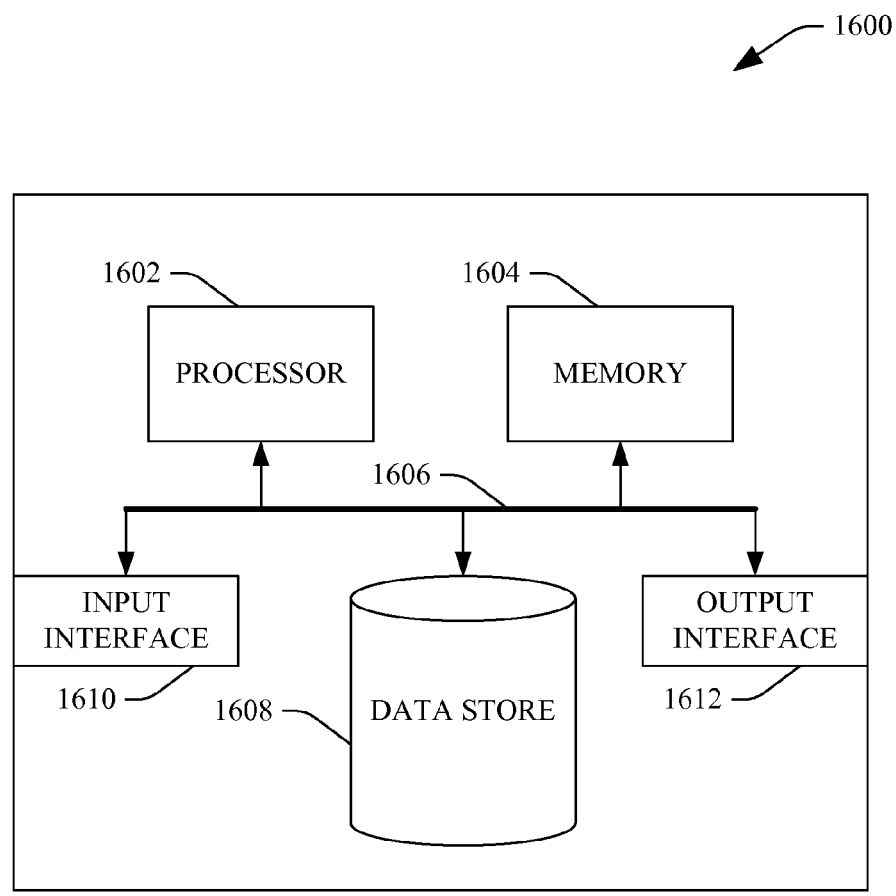
FIG. 16 is an example computing system.

Now referring to FIG. 16, a high-level illustration of an example computing device 1600 that can be used in accordance with the systems and methodologies disclosed herein is illustrated. For instance, the computing device 1600 may be used in a system that supports determining velocity of an automobile based on data captured by multiple velocity/acceleration sensors. In another example, at least a portion of the computing device 1600 may be used in a system that supports correlating images to velocity values. The computing device 1600 includes at least one processor 1602 that executes instructions that are stored in a memory 1604. The instructions may be, for instance, instructions for implementing functionality described as being carried out by one or more components discussed above or instructions for implementing one or more of the methods described above. The processor 1602 may access the memory 1604 by way of a system bus 1606. In addition to storing executable instructions, the memory 1604 may also store images, velocity values from a velocity sensor, acceleration values from an acceleration sensor, or values derived therefrom.

The computing device 1600 additionally includes a data store 1608 that is accessible by the processor 1602 by way of the system bus 1606. The data store 1608 may include executable instructions, images captured by a digital camera, velocity values captured by velocity sensors, acceleration values captured by acceleration sensors, integrations or differentiations thereof, etc. The computing device 1600 also includes an input interface 1610 that allows external devices to communicate with the computing device 1600. For instance, the input interface 1610 may be used to receive instructions from an external computer device, data from one or more sensors, images from a digital camera, etc. The computing device 1600 also includes an output interface 1612 that interfaces the computing device 1600 with one or more external devices. For example, the computing device 1600 may display text, images, etc. by way of the output interface 1612.

Additionally, while illustrated as a single system, it is to be understood that the computing device 1600 may be a distributed system. Thus, for instance, several devices may be in communication by way of a network connection and may collectively perform tasks described as being performed by the computing device 1600.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method for determining velocity of a vehicle, comprising:
   receiving first acceleration data that is indicative of an acceleration of the vehicle over a period of time, wherein the first acceleration data is received from an accelerometer;
   receiving, from a velocity sensor, first velocity data that is indicative of a velocity of the vehicle over the period of time;
   computing second acceleration data that is indicative of the acceleration of the vehicle over the period of time by performing a differentiation on the first velocity data received from the velocity sensor;
   determining first difference data that is a difference between the first acceleration data and the second acceleration data;
   determining final velocity data for the vehicle based at least in part upon the first difference data; and
   outputting the final velocity data, wherein the method is executed by a processor of a computing device.

2. The method of claim 1, further comprising:
   performing an integration on the first acceleration data to generate second velocity data;
   determining second difference data that is a difference between the first velocity data and the second velocity data;
   performing a Gaussian filter operation on the first difference data to generate first filtered data; and
   determining the final velocity data based at least in part upon the first filtered data and the second difference data.

3. The method of claim 2, further comprising:
   performing an integration on the first filtered data to generate second filtered data;
   determining third difference data that is a difference between the second filtered data and the second difference data;
   performing a morphological filter operation on the third difference data to create third filtered data; and
   determining the final velocity data based at least in part upon the third filtered data.

4. The method of claim 3, further comprising:
   adding the second filtered data to the third filtered data to create fourth filtered data; and
   determining the final velocity data based at least in part upon the fourth filtered data.

5. The method of claim 4, further comprising:
   subtracting the fourth filtered data from the second velocity data to generate the final velocity data.

6. The method of claim 1, further comprising determining a geographic location of the vehicle based at least in part upon the final velocity data.

7. The method of claim 1, wherein the vehicle is an automobile.

8. The method of claim 1, further comprising correlating at least a portion of the final velocity data with at least one image.

9. The method of claim 8, further comprising generating a three-dimensional representation of a building based at least in part upon the determined final velocity data and the at least one image.

10. The method of claim 1, wherein the velocity sensor uses the Doppler effect to determine the first velocity data.

11. The method of claim 1, wherein the acceleration sensor is a MEMs acceleration sensor.

12. A system, comprising:
a processor; and
a memory that comprises a plurality of components that are executed by the processor, the components comprising:
a receiver component that receives:
first velocity data that is indicative of a velocity of a vehicle over a period of time, wherein the first velocity data is received from a velocity sensor; and
second velocity data that is indicative of the velocity of the vehicle over the period of time, wherein the second velocity data is computed based upon first acceleration data received from an acceleration sensor, the first acceleration data indicative of acceleration of the vehicle over the period of time; and
a modifier component that:
determines a difference between the first velocity data and the second velocity data; and
outputs at least one final velocity value for the vehicle based at least in part upon the difference.

13. The system of claim 12, wherein the velocity sensor is mounted to the vehicle and the accelerometer is mounted to the vehicle.

14. The system of claim 13, wherein the velocity sensor uses the Doppler effect to output the first velocity data, and wherein the acceleration sensor is a MEMs acceleration sensor.

15. The system of claim 12, wherein the first velocity data corresponds to second acceleration data, and wherein the plurality of components further comprises a first filter component that executes a Gaussian filter operation on a difference between the first acceleration data and the second acceleration data to generate first filtered data, wherein the modifier component determines the at least one final velocity value based at least in part upon the first filtered data.

16. The system of claim 15, wherein the plurality or components further comprises:
an integrator component that performs an integration on the first filtered data to create second filtered data; and
a difference determiner component that determines a difference between the second filtered data and the difference between the first velocity data and second velocity data, wherein the modifier component determines the at least one final velocity value based at least in part upon the difference between the second filtered data and the difference between the first velocity data and the second velocity data.

17. The system of claim 16, wherein the plurality of components further comprises:
a second filter component that performs a morphological filter operation over the second difference data to generate third filtered data, wherein the modifier component determines the at least one final velocity value based at least in part upon the third filtered data.

18. A computer-readable data storage device comprising instructions that, when executed by a processor, causes the processor to perform acts comprising:
receiving first velocity data from a velocity sensor;
receiving first acceleration data from an accelerometer;
generating second velocity data using the first acceleration data;
generating second acceleration data using the first velocity data;
determining a difference between the first acceleration data and the second acceleration data to generate first difference data;
determining a difference between the first velocity data and the second velocity data to generate second difference data;
performing a Gaussian filter operation on the first difference data to generate first filtered data;
performing an integration on the first filtered data to generate second filtered data;
determining a difference between the second filtered data and the second velocity data to generate third difference data;
performing a morphological filter operation on the third difference data to generate third filtered data;
adding the second filtered data with the third filtered data to generate fourth filtered data; and
subtracting the fourth filtered data from the second velocity data to generate final velocity data.

* * * * *